United States Patent [19]

Oshida et al.

[11] Patent Number: 5,220,174
[45] Date of Patent: Jun. 15, 1993

[54] APPARATUS FOR CONTROLLING THE DOSE OF IRRADIATION

[75] Inventors: Mamoru Oshida, Funabashi; Masaru Oizumi, Tokyo; Yoshiyuki Ichizawa, Soka, all of Japan

[73] Assignee: Yoshino Kogyosho Co., Ltd., Tokyo, Japan

[21] Appl. No.: 688,516

[22] PCT Filed: Oct. 8, 1990

[86] PCT No.: PCT/JP90/01304
§ 371 Date: Jun. 10, 1991
§ 102(e) Date: Jun. 10, 1991

[87] PCT Pub. No.: WO91/05353
PCT Pub. Date: Apr. 18, 1991

[30] Foreign Application Priority Data

Oct. 9, 1989 [JP] Japan .................... 1-263406

[51] Int. Cl.⁵ ............................................ G21K 5/10
[52] U.S. Cl. ................................ 250/505.1; 250/492.1
[58] Field of Search ......................... 250/505.1, 492.1

[56] References Cited

U.S. PATENT DOCUMENTS

| | | | |
|---|---|---|---|
| 3,826,014 | 7/1974 | Helding | 250/505.1 |
| 4,467,197 | 8/1984 | Stieber | 250/505.1 |
| 5,019,713 | 5/1991 | Schmidt | 250/505.1 |

FOREIGN PATENT DOCUMENTS

| | | | |
|---|---|---|---|
| 57-3920 | 1/1982 | Japan . | |
| 57-3920 | 1/1982 | Japan . | |
| 57-50755 | 3/1982 | Japan | 250/505.1 |
| 61-220844 | 10/1986 | Japan | 250/505.1 |

Primary Examiner—Jack I. Berman
Attorney, Agent, or Firm—Oliff & Berridge

[57] ABSTRACT

An apparatus for controlling dose of irradiation comprising a first barrier body (1) arranged between a conveyer (5) and an irradiation device (6) located opposite to said conveyer (5), the first barrier body (1) being slidably movable along a running direction of the conveyer (5), and a second barrier body (2) arranged in juxtaposition with the first barrier body (1) and slidably movable along the running direction of the conveyer (5), a distance between the first barrier body (1) and the second barrier body (2) being so adjustable as to control the dose of irradiation to the product.

14 Claims, 5 Drawing Sheets

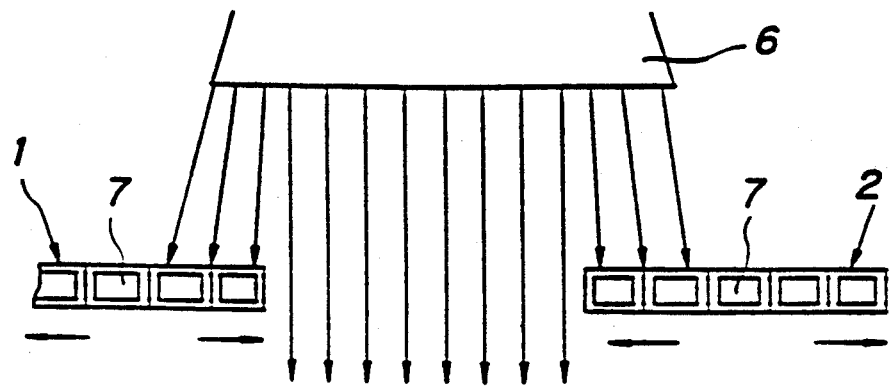
FIG. 10
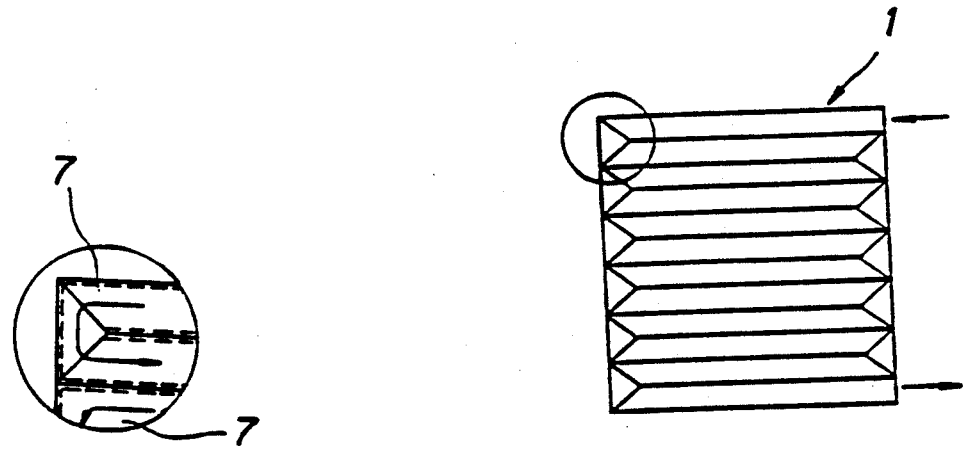
FIG. 11A
FIG. 11

APPARATUS FOR CONTROLLING THE DOSE OF IRRADIATION

BACKGROUND OF THE INVENTION

This invention relates to an apparatus for controlling the dose of irradiation designed for controlling the dose of electron rays to be irradiated to a synthetic resin product such as a bottle or a film or its preform in order to eliminate the monomers contained in it as well as the dose of ultraviolet or infrared rays to be irradiated to such a product of surface treatment, material treatment or sterilization.

With an object of eliminating the monomers contained in synthetic resin products, their preforms are normally carried through an electron rays irradiation zone on a belt conveyer in a production line. A number of conveyers arranged in parallel may be arranged to pass through such an electron rays irradiation zone, each of the conveyers carrying products of a type which is different from those of the other conveyers.

With such an arrangement, the amount of electron rays to be irradiated to products should be differentiated depending on the thickness and shape of the products and other considerations. Such differentiation of dose of electron rays is normally realized by moving the belt conveyers at different speeds to optimize the duration of exposure to each products in the irradiation zone, the speed of each of the belt conveyers being appropriately selected to meet the required amount of electron rays for the preforms on it.

With a conventional apparatus for exposure of products to electron rays or other rays, the number of products that can be fed to a conveyer per unit time often differs from the number of products that can be treated by electron rays per unit time. Thus, such discrepancy results in congestion of products on belt conveyers and accidental fall of some of them from the conveyers, arising in trouble such as a poor productivity of the production line.

In other words, if a plurality of conveyers are installed within a production line, the number of products fed to each of the conveyers is a function of their size and shape while the speed at which each of the conveyers is operated is a function of the dose required by the products being carried on it and there are not any existing apparatuses that simultaneously satisfy these two functional requirements, entailing too poorly fed conveyers that operate at a high speed and too heavily fed conveyers that operate at a low speed and accompanied by the problem of congestion and occasional accidents.

SUMMARY OF THE INVENTION

It is therefore an object of the invention to provide an apparatus for controlling the dose of irradiation that can accurately control the dose of electron rays, ultraviolet rays, infrared rays or other rays to meet the exposure requirements of the products in a production line and therefore eliminate the problem of congestion and occasional accidents as described above.

According to the invention, the above object of the invention is achieved by providing an apparatus for controlling dose of irradiation comprising a first barrier body arranged between a conveyer and an irradiation device located opposite to the conveyer, the first barrier body being slidably movable along a running direction of the conveyer, and a second barrier body arranged in juxtaposition with the first barrier body and slidably movable along the running direction of the conveyer, a distance between the first barrier body and the second barrier body being so adjustable as to control the dose of irradiation to the product.

Alternatively, the first barrier body and the second barrier body have the same configuration and are vertically juxtaposed, and each body comprises a plurality of oblique sections arranged oblique to the running direction of the conveyer.

Still alternatively, the first and second barrier bodies may be formed in the form of flat plates which are horizontally juxtaposed along the moving direction of the conveyer.

Each of the first and second barrier bodies may alternatively be so configured that it comprises a conduit for cooling water to circulate through its entire internal area.

With an apparatus for controlling the dose of irradiation according to the invention, where a product is exposed to electron rays irradiated by the irradiation device as it moves on the conveyer, the product can be exposed to electron rays to a maximum extent by removing the first and second barrier bodies from the electron rays irradiation zone through a sliding action.

When the dose of the product should be limited to a given extent, it can be controlled by moving the first and second barrier bodies until the gap between the two barrier bodies meets the required dose so that the product is exposed only to those electron rays that come through the gap.

When, alternatively, the first and second barrier bodies are identically formed and vertically juxtaposed, each comprising a plurality of oblique sections, they may be placed in a completely overlapped position through a sliding action between the irradiation device and the conveyer to maximize the gap through which electron rays can pass and therefore the exposure of the product to the rays (See FIGS. 2 and 4). For limiting the dose of the product, the first and second barrier bodies are moved relative to each other along the moving direction of the conveyer through a sliding action so that any two corresponding oblique sections of the barrier bodies that have been overlapped are now separated from each other to reduce the area of the gaps between any adjacent sections and hence to limit the exposure of the product to electron rays to a desired level.

When, still alternatively, the first and second barrier bodies are formed in the form of flat plates which are horizontally juxtaposed along the moving direction of the conveyer, the gap between the two plates can be increased by separating them away from each other to consequently increase the dose of the product on the conveyer. Conversely, the dose can be reduced by bringing the two plates closer to each other and reducing the gap between them.

When each of the first and second barrier bodies are provided with a conduit for cooling water to run through its entire internal area, they can be effectively cooled even if they are excessively heated by the irradiated electron rays. Since the water is constantly circulated through the conduit in each of the barrier bodies, any danger for the water to emit heat due to the air bubbles formed in the water through irradiation of electron rays is effectively eliminated.

Now the invention will be described in greater detail by referring to the accompanying drawings that illustrate preferred embodiments of the invention.

BRIEF DESCRIPTION OF THE DRAWINGS

FIG. 10 is a cross sectional view of part of the embodiment of FIG. 9.

FIG. 11 is a view illustrating the conduit provided in the barrier bodies according to the invention.

FIG. 11A is an enlarged partial view of the conduit shown in FIG. 11.

PREFERRED EMBODIMENT OF THE INVENTION

Figure 1:
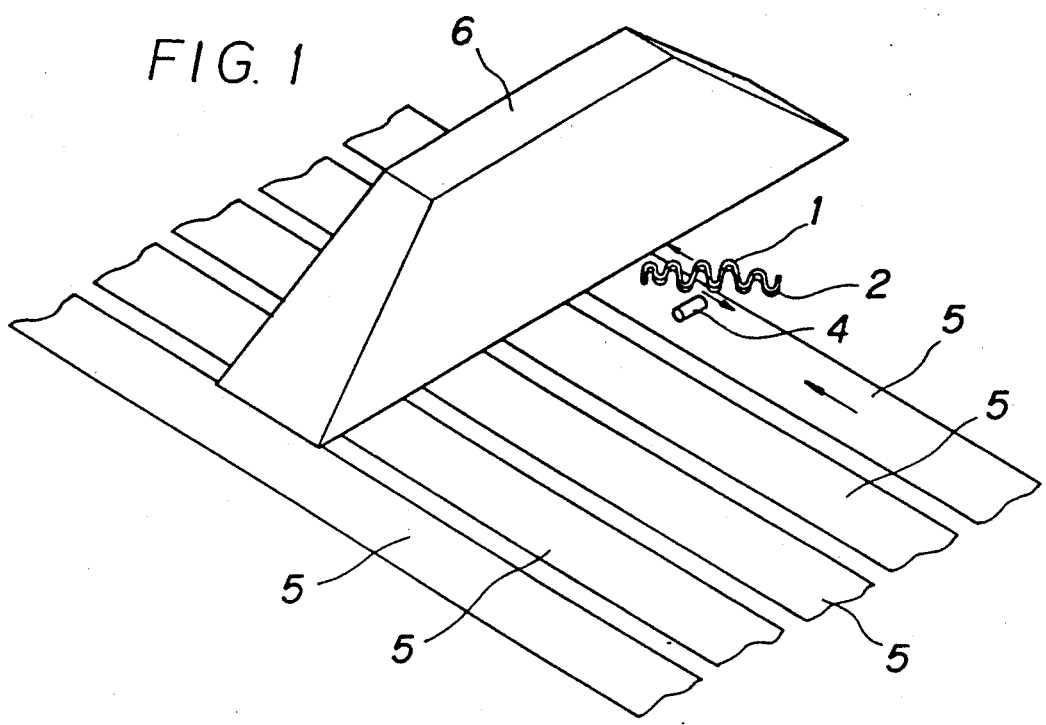
FIG. 1 is a schematic perspective view of a first embodiment of the invention.
Figure 2:
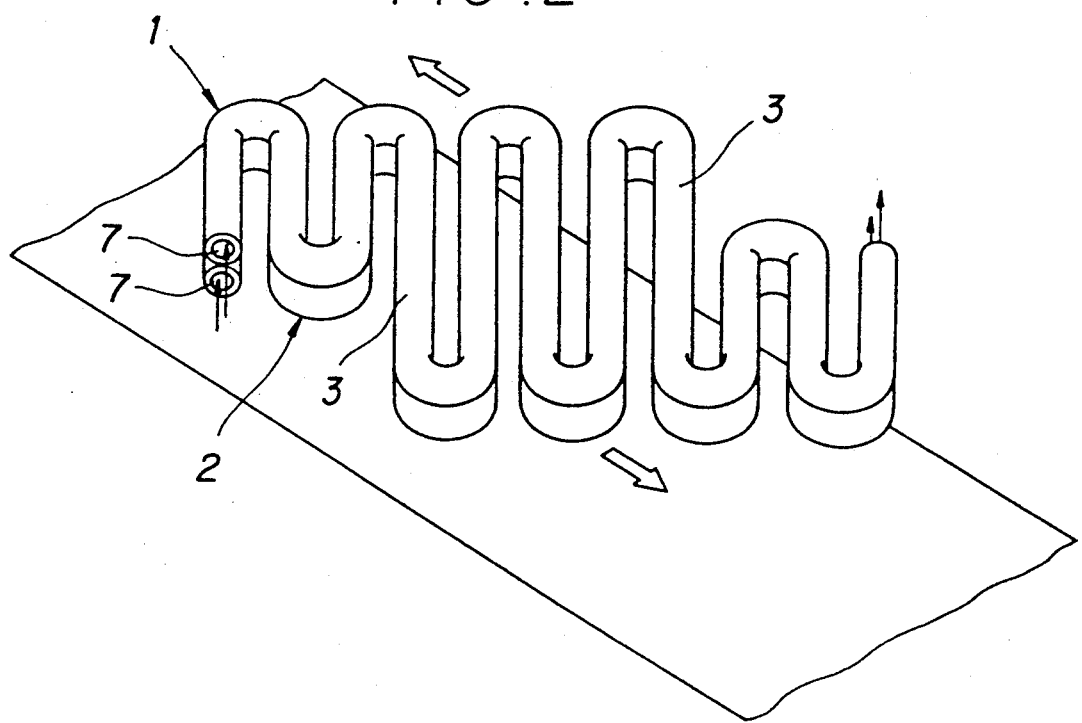
FIG. 2 is a schematic perspective view of the first and second barrier bodies of the embodiment of FIG. 1, where the first and second barrier bodies are found in a completely overlapped position.
Figure 3:
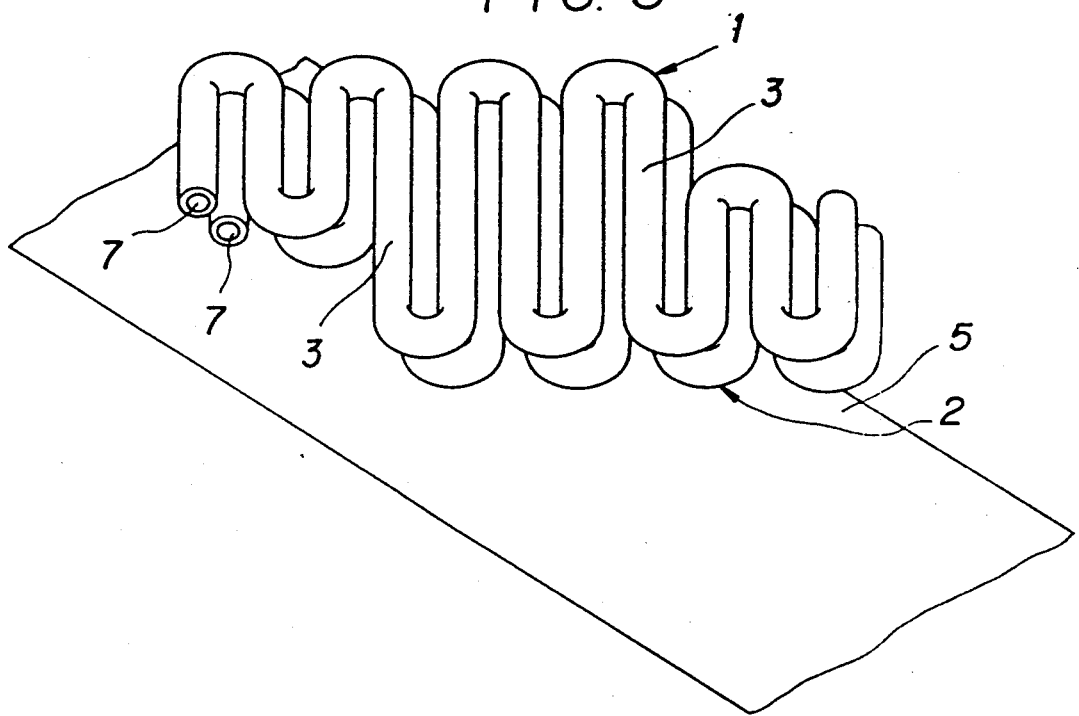
FIG. 3 is a perspective view similar to FIG. 2 but showing the first and second barrier bodies separated from each other.
Figure 4:
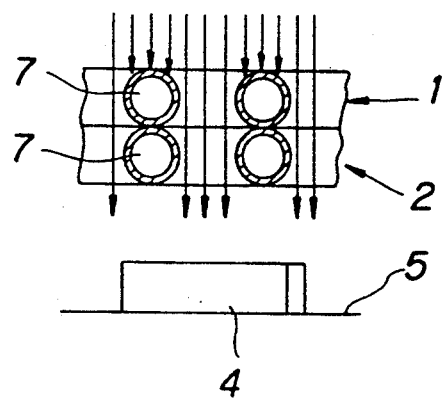
FIG. 4 is a cross sectional view of part of the first and second barrier bodies under the condition of FIG. 2, where the two barrier bodies are completely overlapped.
Figure 5:
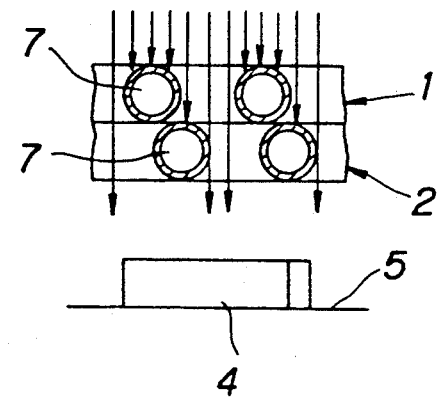
FIG. 5 is a cross sectional similar to FIG. 4 but showing that the two barrier bodies are separated from each other.

Referring to FIGS. 1 through 5 that illustrate a first preferred embodiment of the invention, the apparatus of the first embodiment is placed immediately below an electron rays irradiation device 6 for effectively removing monomers from a preform 4 of a synthetic resin product by means of electron rays irradiated from the irradiation device 6. A first barrier body 1 and a second barrier body 2 have the same configuration, each has a plurality of oblique sections 3 arranged oblique to the moving direction of a conveyer 5. The first and second barrier bodies 1, 2 are vertically juxtaposed and each of them comprises a serpentine stainless steel pipe which is folded for a number of times to form a zigzag route. Cooling water passes through the pipe. The stainless steel pipe is made of SUS304 of Japanese Industrial Standards with an object of preventing rust formed on the surface thereof under the influence of ozone to be generated by electron rays.

The angle of the oblique sections 3 relative to the moving direction of the conveyer 5 is preferable between 15° and 90°, but is not limited thereto.

In this embodiment, the conveyer 5 includes a number of buckets for receiving a preform 4 (not shown). Each bucket carries the preform 4 therein while the preform 4 is constantly rotated so that it is evenly exposed to electron rays in the bucket.

The present invention is not limited to the case in which preforms carried by the conveyer are rotated. The case in which the carried preform is not rotated is included in the present invention.

Figure 6:
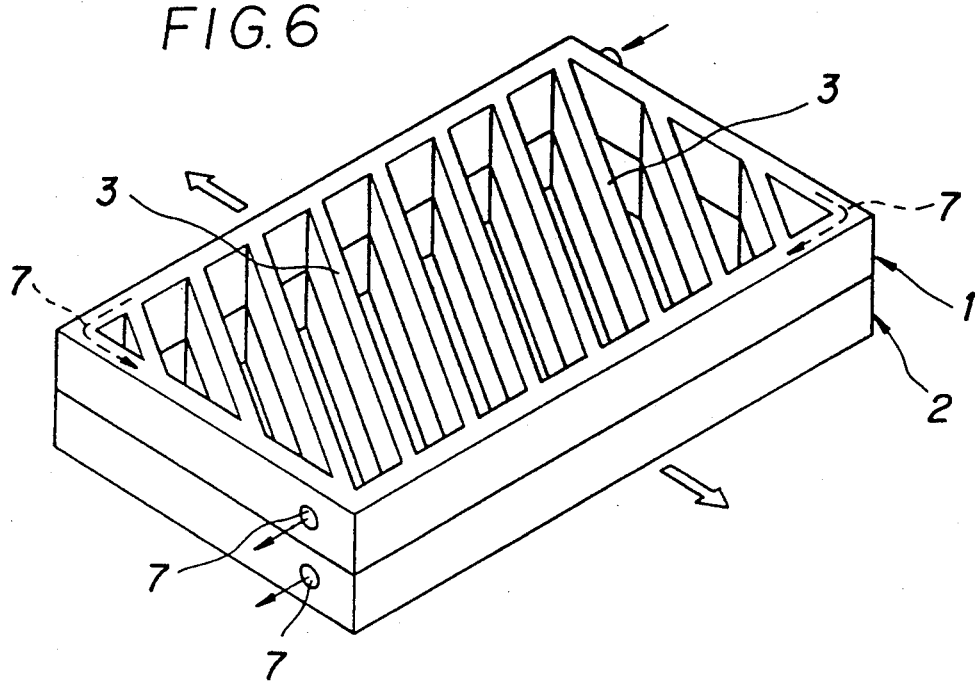
FIG. 6 is a schematic perspective view of a second embodiment of the invention, showing that the first and second barrier bodies are completely overlapped.
Figure 7:
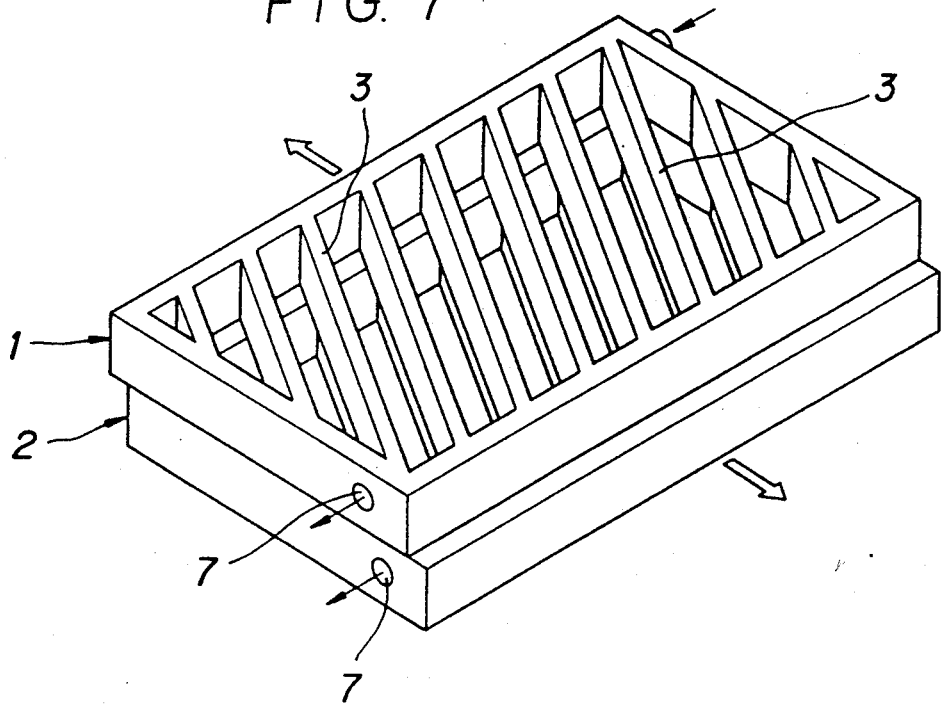
FIG. 7 is a schematic perspective view similar to FIG. 6 but showing that the first and second barrier bodies are slightly separated from each other.
Figure 8:
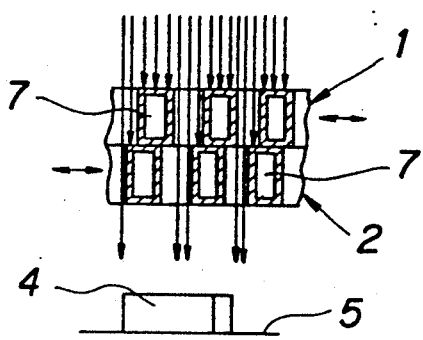
FIG. 8 is a cross sectional view of part of the embodiment of FIG. 6 under the condition where the two bodies are slightly separated from each other.

Now, a second preferred embodiment of the invention will be described by referring to FIGS. 6 through 8.

Like the first embodiment, first and second barrier bodies 1 and 2 in this second embodiment have the same configuration, and are vertically juxtaposed. Each barrier body comprises a rectangular shaped frame and a plurality of oblique sections 3 obliquely arranged relative to lateral and longitudinal members of the frame. The frame members and oblique sections 3 are hollow in cross section and communicate with one another to form a complete route for circulation of cooling water that runs through them from an end to the other end of the route.

Figure 9:
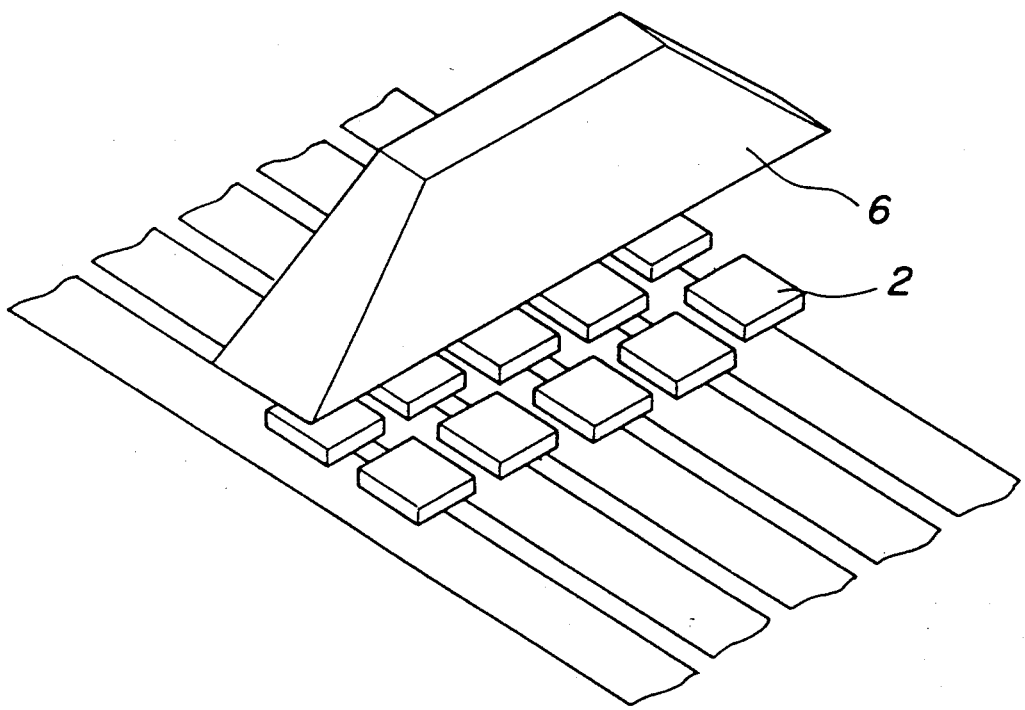
FIG. 9 is schematic perspective view of a third embodiment of the invention.

FIGS. 9 through 11 shows a third embodiment of the invention. In this embodiment, the first and second barrier bodies 1 and 2 are formed in the form of flat plates and horizontally juxtaposed along the running direction of the conveyer 5. The dose of the irradiation of the electron rays to the product 4 can be increased by separating the body 1 and the body 2 far apart from each other or reduced by bringing them close to each other. Each of the barrier bodies 1 and 2 is formed with a conduit 7 through which cooling water runs so that the barrier body may be effectively cooled.

It may be needless to say that an apparatus for controlling the dose of irradiation according to the invention is applicable not only to control of the dose of electron rays of synthetic resin products but also to that of ultraviolet or infrared rays to be used for surface treatment or material treatment.

It may also be needless to say that the use of an apparatus for controlling the dose of irradiation according to the present invention is not limited to preforms of synthetic resin bottles or films but applicable to those of synthetic resin tubes and other forms as well as to metal products, paper products and so on.

As is apparent from the above description, since an apparatus for controlling the dose of irradiation according to the present invention can control the dose of electron rays, ultraviolet rays, infrared rays and the like for products by adjusting the gap between its first and second barrier bodies, the running speed of a conveyer carrying the products can be determined so as to match the rate of supply of products making it unnecessary to reduce the speed of the conveyer to maximize the dose for the products. Consequently, with an apparatus according to the invention, the problem of congested production lines and reduced line productivity is completely eliminated.

Moreover, since each of the first and second barrier bodies is provided with a conduit for circulation of cooling water, they can be effectively cooled even if they are undesirably heated by electron rays and any bubbles of water that can be formed in the water and store heat can be effectively moved away to eliminate any danger of storage of excessive heat within the barrier bodies. Therefore, an apparatus for controlling the dose of irradiation according to the present invention is highly durable and hence remarkably cost effective.

What is claimed is:

1. An apparatus for controlling a dose of irradiation to a product comprising a first barrier body arranged between a conveyer and an irradiation device located opposite to said conveyer, said first barrier body being slidably movable along a running direction of said conveyer, and a second barrier body arranged in juxtaposition with said first barrier body and slidably movable along the running direction of said conveyer, a distance between said first barrier body and said second barrier body being adjustable for controlling the dose of irradiation to the product, wherein at least one of said first and second barrier bodies has a conduit integrally formed therein for circulation of cooling fluid within said body and said first barrier body and second barrier body have a same configuration and each of said first barrier body and said second barrier body comprises a plurality of oblique sections arranged obliquely to the running direction of said conveyer.

2. The apparatus for a dose of irradiation according to claim 1, wherein said first barrier body and said second barrier body are vertically juxtaposed.

3. The apparatus for controlling a dose of irradiation according to claim 1, wherein said first and second barrier bodies are serpentine conduits.

4. The apparatus for controlling a dose of irradiation according to claim 1, wherein said first and second barrier bodies comprise a frame with oblique sections arranged between opposed sides of said frame in a spaced generally parallel relationship.

5. The apparatus for controlling a dose of irradiation according to claim 1, wherein said first and second barrier bodies are plates and said conduits are serpentine passages extending across the length and width of said plates.

6. The apparatus for controlling a dose of irradiation according to claim 1, wherein said first and second bodies are obliquely arranged at an angle of between about 15° and 90° to the running direction of the conveyer.

7. An apparatus for controlling a dose of irradiation comprising:
an irradiation device;
a conveyer extending under said irradiation device, said conveyer being fed objects at a predetermined feed rate and said conveyer transporting said objects in a running direction
a conveyer extending under said irradiation device, said conveyer being fed objects at a predetermined feed rate and said conveyer transporting said objects in a running direction at a conveyer speed determined by said feed rate under said irradiation device;

a first barrier body arranged between said conveyer and said irradiation device, said first barrier body being slidably movable along the running direction of said conveyer;

a second barrier body slidably movable along the running direction of said conveyer and arranged in juxtaposition with said first barrier body, wherein relative movement between said first barrier body and said second barrier body is used to control irradiation to each of the objects travelling in the running direction at said conveyer speed such that each of said objects receives a required dose of irradiation, said first barrier body and said second barrier body having a same configuration and each of said first barrier body and said second barrier body comprising a plurality of oblique sections which are arranged obliquely to the running direction of said conveyer.

8. The apparatus for controlling a dose of irradiation according to claim 7, wherein said oblique sections have an angle oblique to the running direction of said conveyer of between about 15° and 90°.

9. The apparatus for controlling a dose of irradiation according to claim 7, wherein said first and second barrier bodies are formed with integral conduits therein for circulation of cooling fluid within said bodies.

10. The apparatus for controlling a dose of irradiation according to claim 7, wherein said first and second barrier bodies are serpentine conduits.

11. The apparatus for controlling a dose of irradiation according to claim 7, wherein said first and second barrier bodies each comprise a frame with oblique sections arranged between opposed sides of said frame in a spaced generally parallel relationship, said frame and said oblique sections being hollow and in communication with each other for circulation of a cooling fluid.

12. The apparatus for controlling a dose of irradiation according to claim 7, wherein said first and second barrier bodies are plates each having a serpentine conduit integrally formed therein for circulation of a cooling fluid.

13. The apparatus for controlling a dose of irradiation according to claim 7, wherein said first and second bodies are horizontally juxtaposed along the running direction of said conveyer.

14. The apparatus for controlling a dose of irradiation according to claim 7, wherein said predetermined feed rate is set at a maximum and said conveyer speed is set to correspond to said maximum feed rate.

* * * * *